United States Patent
Hanada et al.

(10) Patent No.: US 9,436,167 B2
(45) Date of Patent: Sep. 6, 2016

(54) DEVICE FOR MONITORING OPERATION OF NUCLEAR PLANT

(75) Inventors: Satoshi Hanada, Tokyo (JP); Koji Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 710 days.

(21) Appl. No.: 13/876,751

(22) PCT Filed: Oct. 21, 2011

(86) PCT No.: PCT/JP2011/074351
§ 371 (c)(1),
(2), (4) Date: Mar. 28, 2013

(87) PCT Pub. No.: WO2012/060233
PCT Pub. Date: May 10, 2012

(65) Prior Publication Data
US 2013/0245848 A1 Sep. 19, 2013

(30) Foreign Application Priority Data
Nov. 5, 2010 (JP) ................. 2010-249090

(51) Int. Cl.
G05B 11/01 (2006.01)
G05B 9/02 (2006.01)
G21D 3/00 (2006.01)
G05B 23/02 (2006.01)

(52) U.S. Cl.
CPC ............ *G05B 9/02* (2013.01); *G05B 23/0291* (2013.01); *G21D 3/008* (2013.01); G05B 2219/31356 (2013.01); Y02E 30/40 (2013.01); Y02P 90/14 (2015.11)

(58) Field of Classification Search
CPC ...... G05B 9/02; G05B 23/0291; Y05E 30/40
USPC ............................................. 700/17
See application file for complete search history.

(56) References Cited

U.S. PATENT DOCUMENTS 4,421,716 A * 12/1983 Hench ............... G21D 3/06
376/207
4,786,462 A * 11/1988 Garabedian ............ G21C 1/03
376/272

(Continued)

FOREIGN PATENT DOCUMENTS

JP 2-244396 A 9/1990
JP 2947840 B2 9/1999

(Continued)

OTHER PUBLICATIONS

Decision of a Patent Grant dated Jul. 28, 2015, issued in counterpart Japanese Application No. 2010-249090, with English translation. (4 pages).

(Continued)

*Primary Examiner* — Robert Fennema
*Assistant Examiner* — Sivalingam Sivanesan
(74) *Attorney, Agent, or Firm* — Westerman, Hattori, Daniels & Adrian, LLP

(57) ABSTRACT

There is provided a device for monitoring an operation of a nuclear plant, including: a functional integration VDU having a regular-use-system VDU that monitors the operation of the plant under normal conditions, and a security-system VDU that leads to a safe state when the plant is in an abnormal state; and a security-system VDU that leads to a safe state when the plant is in an abnormal state. The functional integration VDU is mounted to a first operating console, the security-system VDU is mounted to a second operating console, and thereby an increase in the size of the operating consoles in the nuclear plant is suppressed, and increased ease of operation is enabled.

3 Claims, 3 Drawing Sheets

(56) References Cited

U.S. PATENT DOCUMENTS

| | | | |
|---|---|---|---|
| 7,346,432 B2 * | 3/2008 | Matsumiya | G01V 1/008 52/167.1 |
| 2009/0055784 A1 * | 2/2009 | Izumi | G06F 17/5027 716/106 |
| 2010/0106264 A1 * | 4/2010 | Nishijima | G05B 9/02 700/82 |
| 2010/0246741 A1 * | 9/2010 | Nishijima | G21D 3/008 376/259 |

FOREIGN PATENT DOCUMENTS

| | | | | |
|---|---|---|---|---|
| JP | 2003-207591 A | 7/2003 | | |
| JP | 2005-114516 A | 4/2005 | | |
| JP | 2007-041982 A | 2/2007 | | |
| JP | 2007041982 A * | 2/2007 | | G05B 23/02 |
| JP | 2008-115661 A | 5/2008 | | |

OTHER PUBLICATIONS

English Translation of Written Opinion of PCT/JP2011/074351, mailed Dec. 6, 2011.

International Search Report for PCT/JP2011/074351, mailing date of Dec. 6, 2011.

Written Opinion of PCT/JP2011/074351, mailing date of Dec. 6, 2011.

* cited by examiner

DEVICE FOR MONITORING OPERATION OF NUCLEAR PLANT

FIELD

The present invention relates to a device for monitoring an operation of a nuclear plant capable of operating a safety system and a regular use system (non-safety system).

BACKGROUND

There is a need for an instrumentation and control system that has high reliability and may be easily operated in order to stably operate a nuclear power plant. An application of a central control panel of a software operation type, and digitization of control-system and security-system equipment is indispensable to ensure the instrumentation and control system. The instrumentation and control system in the nuclear power plant includes a central control panel used when an operator monitors an operation of the plant, and the central control panel includes a regular-use-system (non-security-system) device which measures a process amount of the plant to monitor an operation of auxiliary equipment such as a pump and a valve, and a security-system device which safely suspends the plant when the plant is in an abnormal state.

Heretofore, a central control room accommodates a regular-use-system device for monitoring an operation and a security-system device for monitoring an operation which are disposed side by side in an approximately linear shape in the same operating console serving as the central control panel.

As an example of the device for monitoring operations of the nuclear plant, a device is disclosed in Patent Literature 1 below.

CITATION LIST

Patent Literature

Patent Literature 1: Japanese Patent No. 2947840

SUMMARY

Technical Problem

Heretofore, since a regular-use-system device for monitoring an operation and a security-system device for monitoring an operation have been disposed in the same operating console in a central control room, the entire operating console needs to be robust. Therefore, a manufacturing cost increases, and the device increases in size. That is, the security-system device for monitoring an operation is used to safely suspend the nuclear plant when the nuclear plant is in an abnormal state, and thus needs to be manufactured to have a structure superior in a seismic resistance. On the other hand, the regular-use-system device for monitoring an operation is used to monitor an operation of auxiliary equipment of the nuclear plant, and thus may have a structure having a general seismic resistance. However, since the security-system and regular-use-system devices for monitoring an operation are disposed in the same operating console, the entire operating console of the security-system and the regular-use-system needs to have a structure superior in a seismic resistance, which entails an increase in manufacturing cost and an increase in size of the device, and there is a fear that an indoor passage space is limited.

The invention is made to resolve the above-described issue, and an object of the invention is to provide a device, for monitoring an operation of a nuclear plant, capable of facilitating an operation by suppressing an increase in size of an operating console in the nuclear plant.

Solution to Problem

In order to achieve the object, there is provided a device for monitoring an operation of a nuclear plant, including: a first operating console having a regular-use-system control function of monitoring an operation of the plant in a normal state and a security-system control function of leading the plant in an abnormal state to a safe state; and a second operating console having a security-system control function of leading the plant in an abnormal state to a safe state.

Accordingly, when a first operating console having a regular-use-system control function and a security-system control function, and a second operating console having a security-system control function are provided, only the second operating console may have a structure superior in a seismic resistance, and the first operating console may have a structure having a general seismic resistance. Thus, an increase in size of an operating console due to seismic strengthening may be suppressed, and an operation may be facilitated.

The device for monitoring an operation of a nuclear plant according to the present invention is characterized that the first operating console is disposed at a center of a central control room, and the second operating console is disposed near a wall surface of the central control room to be adjacent to the first operating console.

Accordingly, by appropriately disposing the respective operating consoles, it is possible to attempt an efficient use of a space within a central control room.

The device for monitoring an operation of a nuclear plant of the invention is characterized in that the plant in an abnormal state is led to a safe state using the security-system control function of the second operating console when the security-system control function in the first operating console is in an abnormal state, and a block device is provided to inhibit an operation of the security-system control function by the first operating console when the security-system control function in the first operating console is in an abnormal state.

Accordingly, when the security-system control function in the first operating console is in a normal state, the plant in an abnormal state is led to a safe state using the security-system control function. On the other hand, when the security-system control function in the first operating console is in an abnormal state, an inhibition an operation of the security-system control function by the first operating console is prevented using the block device, and the plant in an abnormal state is led to a safe state using the security-system control function of the second operating console. In this case, using the first operating console, an operation of the plant in a normal state may be monitored, and the plant in an abnormal state may be controlled, and thus an operation in the nuclear plant may be facilitated. In addition, when the security-system control function in the first operating console is in an abnormal state, an inhibition of an operation of the security-system control function of the second operating console by the security-system control function of the first operating console is prevented using the block device, and the plant in an abnormal state is led to a safe state using the security-system control function of the second operating console, and thus the plant in an abnormal state may be reliably controlled, and a high security of an operation control may be ensured.

Advantageous Effects of Invention

According to the device for monitoring an operation of a nuclear plant of the invention, a first operating console having a regular-use-system control function and a security-system control function, and a second operating console having a security-system control function are provided, and thus only the second operating console may have a structure superior in a seismic resistance, and the first operating console may have a structure having a general seismic resistance. As such, an increase in size of an operating console due to seismic strengthening may be suppressed, and an operation may be facilitated.

DESCRIPTION OF EMBODIMENTS

Hereinafter, a preferred embodiment of a device for monitoring an operation of a nuclear plant according to the invention will be described in detail with reference to accompanying drawings. It should be noted that the invention is not limited to the embodiment.

Embodiment

Figure 1:
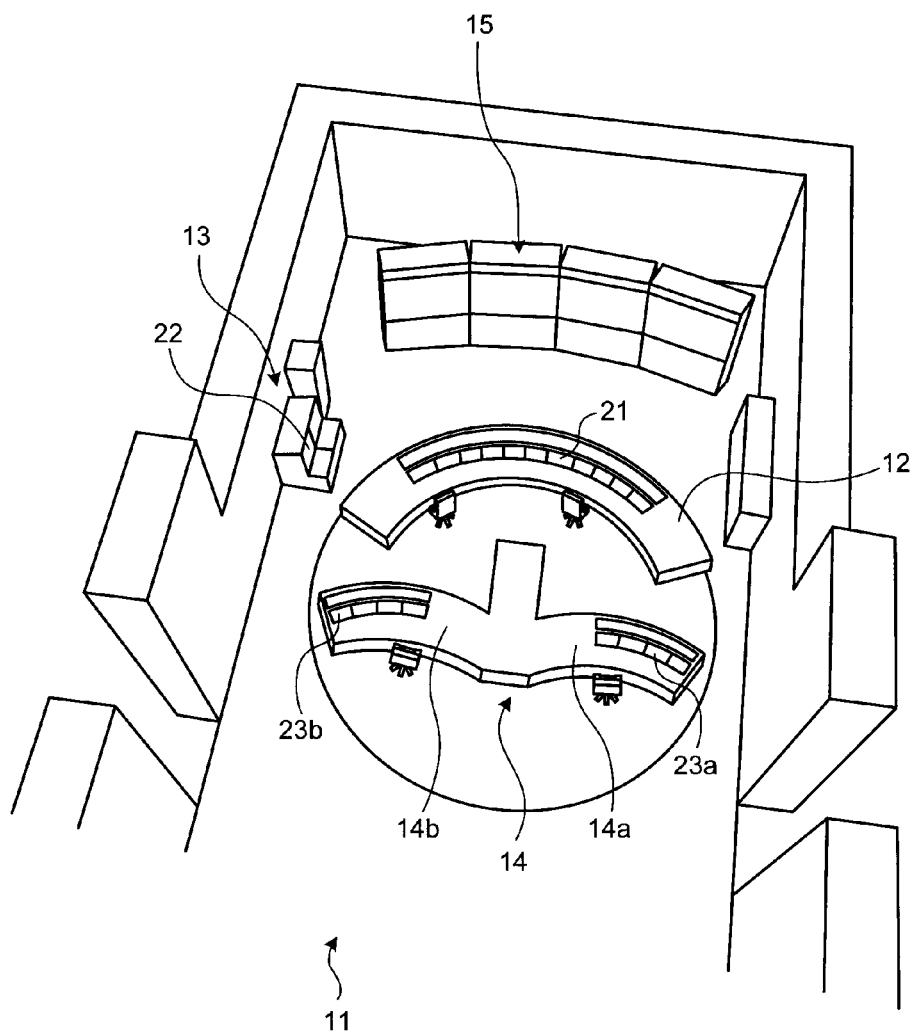
FIG. 1 is a schematic diagram illustrating a central control room in a device for monitoring an operation of a nuclear plant according to an embodiment of the invention.
Figure 2:
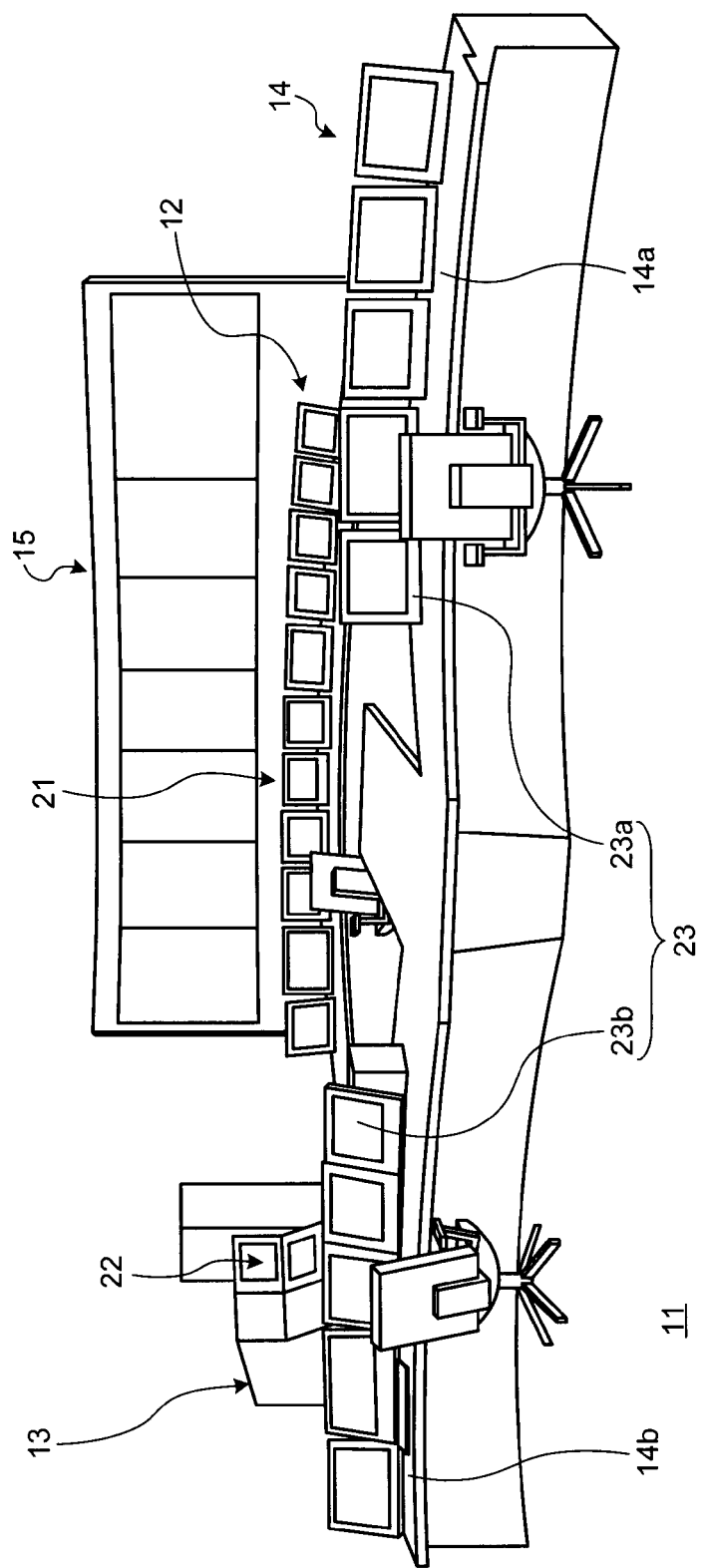
FIG. 2 is a schematic diagram illustrating a functional integration VDU and a security-system VDU in the device for monitoring an operation of a nuclear plant of the embodiment.
Figure 3:
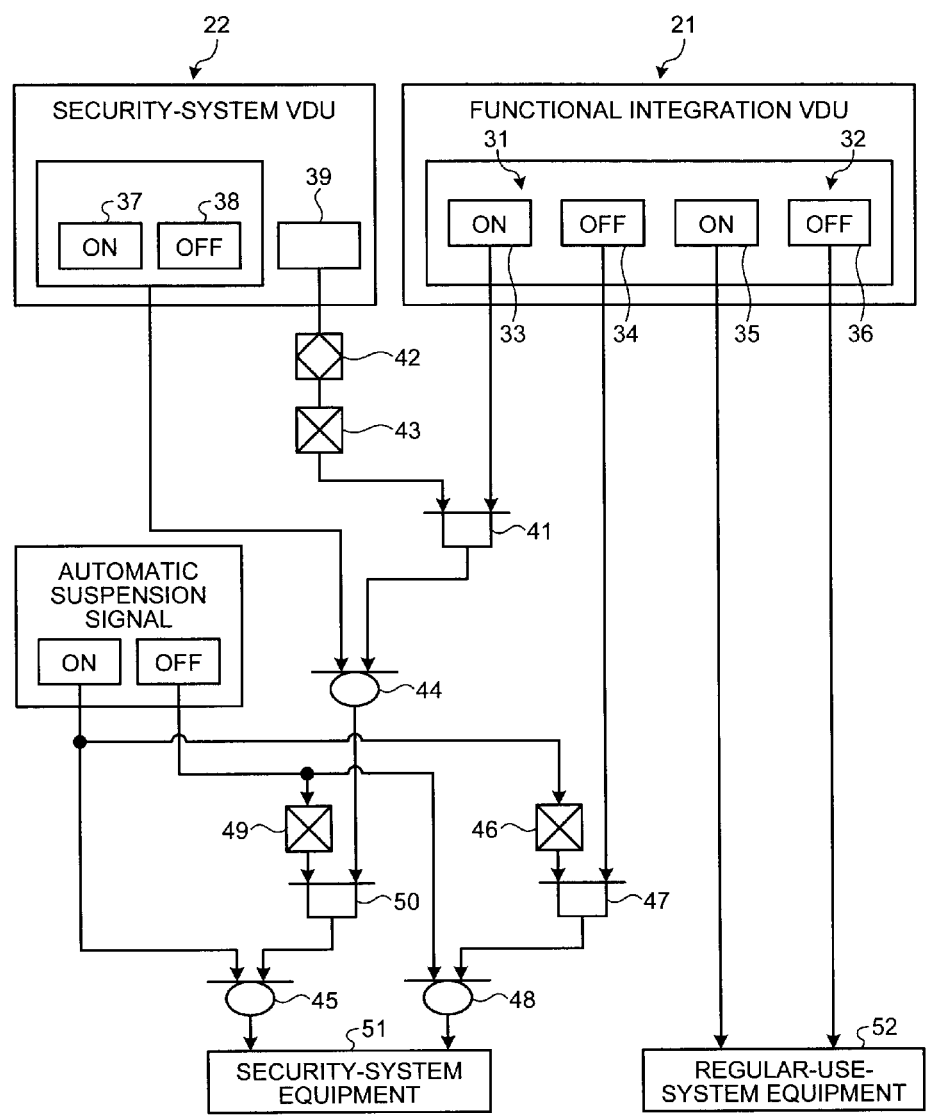
FIG. 3 is a schematic diagram illustrating a control block in the device for monitoring an operation of a nuclear plant of the embodiment.

FIG. 1 is a schematic diagram illustrating a central control room in a device for monitoring an operation of a nuclear plant according to an embodiment of the invention, FIG. 2 is a schematic diagram illustrating a functional integration VDU and a security-system VDU in the device for monitoring an operation of a nuclear plant of the embodiment, and FIG. 3 is a schematic diagram illustrating a control block in the device for monitoring an operation of a nuclear plant of the embodiment.

In the device for monitoring an operation of a nuclear plant of the embodiment, as illustrated in FIGS. 1 and 2, a central control room 11 is an almost sealed room, and includes a first operating console 12, a second operating console 13, an operation command console 14, and a large-size display panel 15. In this case, the large-size display panel 15 is disposed in the foremost position, and the first operating console 12 is disposed to face a front face of the large-size display panel 15 toward the large-size display panel 15. In addition, the second operating console 13 is disposed on a wall surface of the central control room 11 to be adjacent to the first operating console 12. The operation command console 14 is disposed behind the first operating console 12 to face a front face of the large-size display panel 15 toward the large-size display panel 15.

That is, in the central control room 11, the first operating console 12 and the operation command console 14 are disposed in the center, and the second operating console 13 is disposed near a wall surface of the central control room 11 to be adjacent to the first operating console 12. Specifically, the operation command console 14 is disposed at an approximately central portion of a circle drawn in a central part of the central control room 11, and the first operating console 12 is disposed to form an arc on the circle at a side of the large-size display panel 15. The second operating console 13 is disposed to be in close contact with a wall surface of the central control room 11 on an outside of the circle.

A functional integration VDU 21 is mounted to the first operating console 12, and a security-system VDU 22 is mounted to the second operating console 13. The functional integration VDU 21 has a regular-use-system control function of monitoring an operation of a plant when the plant is in a normal state, and a security-system control function of safely suspending (leading to a safe state) a plant when the plant is in an abnormal state. On the other hand, the security-system VDU 22 is a VDU for backing up the security-system control function in the functional integration VDU 21, and has a security-system control function of safely suspending (leading to a safe state) a plant when the plant is in an abnormal state. The VDU refers to a visual display unit.

In addition, the first operating console 12 (functional integration VDU 21) and the second operating console 13 (security-system VDU 22) are operated by an operator. On the other hand, the operation command console 14 is operated by a shift supervisor who gives instructions to an operator, and a VDU for administrative use 23 is mounted thereto. In the embodiment, the operation command console 14 includes a supervision command console 14a (VDU for supervisor 23a) and a technology command console 14b (VDU for technician 23b).

In this case, the second operating console 13 to which the security-system VDU 22 is mounted has a structure covered with a hard iron plate to have a structure superior in a seismic resistance. On the other hand, the first operating console 12 to which the functional integration VDU 21 having the regular-use-system control function and the security-system control function is mounted may have a structure having a general seismic resistance, and does not need to have a structure covered with a hard iron plate.

In the central control room 11 in the device for monitoring an operation of a nuclear plant of the embodiment, a block device is provided to inhibit (inhibition of an operation) an operation of the security-system control function by the functional integration VDU 21 when the functional integration VDU 21 is in an abnormal state. Herein, the block device is provided in the second operating console 13 (security-system VDU 22).

The block device includes an AND circuit (software) to which a plant suspension signal (plant operating signal) output from the functional integration VDU 21 and a block signal output from the security-system VDU 22 are input. In this case, a plant suspension signal output from the functional integration VDU 21 and the security-system VDU 22, and a block signal output from the security-system VDU 22 are manual signals output by an operation of an operator. The nuclear plant is suspended when one of a plant manual suspension signal output from the functional integration VDU 21 and the security-system VDU 22, and a plant automatic suspension signal output based on a process amount of the plant is output.

That is, as illustrated in FIG. 3, the functional integration VDU 21 has a function of a security-system VDU 31 and a function of a regular-use-system (non-security-system) VDU 32. That is, as the security-system VDU 31, an ON operating switch 33 and an OFF operating switch 34 are provided to operate and suspend various devices in a security-system equipment 51. As the regular-use-system VDU 32, an ON operating switch 35 and an OFF operating switch 36 are provided to operate and suspend various devices in a regular-use-system equipment 52. In this case, herein, the respective operating switches 33 and 34 in the security-system VDU 31, and the respective operating switches 35 and 36 in the regular-use-system VDU 32 are illustrated by an example. However, actually, a plurality of switches are provided as each of the operating switches according to various devices.

The security-system VDU 22 includes an ON operating switch 37 and an OFF operating switch 38 that operate and suspend various devices in the security-system equipment 51, and includes a cutoff operating switch 39 that operates the block device. In this case, herein, the respective operating switches 37, 38, and 39 in the security-system VDU 22 are illustrated by an example. However, actually, a plurality of switches are provided as each of the operating switches according to various devices.

A signal of the ON operating switch 33 of the security-system VDU 31 is input to an AND circuit 41. In addition, a signal of the cutoff operating switch 39 of the security-system VDU 22 is input to the AND circuit 41 via a latch circuit 42 and a NOT circuit 43. In this case, when the cutoff operating switch 39 of the security-system VDU 22 is not operated, an ON signal "0" is inverted in the NOT circuit 43 to be input to the AND circuit 41 as an ON signal "1", and in response to the ON operating switch 33 of the security-system VDU 31 being operated and an ON signal "1" being input to the AND circuit 41, the AND circuit 41 outputs an ON signal "1".

A signal output from the AND circuit 41 is input to an OR circuit 44. In addition, a signal output from the ON operating switch 37 and the OFF operating switch 38 of the security-system VDU 22 is input to the OR circuit 44. In this case, when an ON signal "1" is input from the AND circuit 41 or an ON signal "1" is input from the ON operating switch 37 to the OR circuit 44, the OR circuit 44 outputs an ON signal "1". In the security-system VDU 22, description is made on the assumption that an ON signal "1" is output when the ON operating switch 37 is operated, and an ON signal "0", that is, an OFF signal "1" is output when the OFF operating switch 38 is operated, and none of the switches is operated.

On the other hand, an ON signal "1" is inverted in the NOT circuit 43 to be input to the AND circuit 41 as an ON signal "0" when the cutoff operating switch 39 of the security-system VDU 22 is operated, and the AND circuit 41 does not output an ON signal "1" even when the ON operating switch 33 of the security-system VDU 31 is operated and an ON signal "1" is input to the AND circuit 41. That is, between the security-system VDU 31 of the functional integration VDU 21 and the security-system VDU 22, processing of the security-system VDU 22 is given priority.

The respective operating switches 33 and 34 of the security-system VDU 31 and the respective operating switches 35 and 36 of the regular-use-system VDU 32 in the functional integration VDU 21, and the respective operating switches 37, 38, and 39 in the security-system VDU 22 described in the foregoing are manually operated by an operator. When the operator detects that an abnormality occurs in the security-system equipment 51, the security-system equipment 51 is safely suspended by outputting a manual suspension signal.

On the other hand, multiple sensors are provided to detect a state of various devices in the nuclear plant, and a control device (not illustrated) monitors an operational state based on a detection result of each sensor. When the control device detects that an abnormality occurs in the security-system equipment 51, the security-system equipment 51 is safely suspended by outputting an automatic suspension signal.

An ON signal of the automatic suspension is input to an OR circuit 45, and is input to an AND circuit 47 via a NOT circuit 46. In addition, an OFF signal of an automatic suspension is input to an OR circuit 48, and is input to an AND circuit 50 via a NOT circuit 49. A signal output from the AND circuit 50 is input to the OR circuit 45, and a signal output from the OFF operating switch 34 is input to the OR circuit 48 via the AND circuit 47.

In this case, when the control device outputs an ON signal of an automatic suspension, an ON signal "1" is input to the OR circuit 45, and the OR circuit 45 outputs an automatic suspension ON signal "1" for suspending the security-system equipment 51 irrespective of a signal from the functional integration VDU 21 or the security-system VDU 22. In addition, when an ON signal of a manual suspension is output from the functional integration VDU 21 or the security-system VDU 22 by an operation of an operator, an ON signal "1" is input to the OR circuit 45, and the OR circuit 45 outputs an automatic suspension ON signal "1" for suspending the security-system equipment 51 irrespective of an ON signal of an automatic suspension.

On the other hand, when the control device does not output an ON signal of an automatic suspension, an ON signal "0" is input to the OR circuit 45. In addition, when an ON signal of a manual suspension is not output from the functional integration VDU 21 or the security-system VDU 22 without an operation of an operator, an ON signal "0" is input to the OR circuit 45. For this reason, the OR circuit 45 does not output an automatic suspension ON signal "1" for suspending the security-system equipment 51.

In addition, when the control device outputs an OFF signal of an automatic suspension, an OFF signal "1" is input to the OR circuit 48, and the OR circuit 48 outputs an automatic suspension OFF signal "1" for not suspending the security-system equipment 51 irrespective of a signal from the functional integration VDU 21 or the security-system VDU 22. In addition, when an OFF signal "1" of a manual suspension for not suspending the security-system equipment 51 is output from the functional integration VDU 21 or the security-system VDU 22 by an operation of an operator, an OFF signal "1" is input to the OR circuit 48, and the OR circuit 48 outputs an automatic suspension OFF signal "1" for not suspending the security-system equipment 51 irrespective of an OFF signal of an automatic suspension.

On the other hand, when the control device does not output an OFF signal of an automatic suspension, an OFF signal "0" is input to the OR circuit 48. In addition, when an ON signal of a manual suspension is not output from the functional integration VDU 21 or the security-system VDU 22 without an operation of an operator, an ON signal "0" is input to the OR circuit 45. For this reason, the OR circuit 48 does not output an automatic suspension ON signal "1" for suspending the security-system equipment 51.

Further, when an ON signal "1" of an automatic suspension is output, the ON signal "1" is inverted to an ON signal "0" in the NOT circuit 46, and is input to the AND circuit 47. Thus, even when an operator operates the OFF operating switch 34 to output an OFF signal "1" of a manual suspension, the AND circuit 47 does not output an OFF signal "1".

That is, when an ON signal "1" of an automatic suspension is output, processing of an ON signal "1" of an automatic suspension is given priority over an OFF signal "1" of a manual suspension from the security-system VDU 31 of the functional integration VDU 21 or the security-system VDU 22. When an ON signal "1" of an automatic suspension is not output, an ON signal "0" is inverted to an ON signal "1" in the NOT circuit 46, and is input to the AND circuit 47. Thus, when an operator operates the OFF operating switch 34 to output an OFF signal "1" of a manual suspension, the AND circuit 47 may output an OFF signal "1".

On the other hand, when an OFF signal "1" of an automatic suspension is output, the OFF signal "1" is inverted to an ON signal "0" in the NOT circuit 49, and is input to the AND circuit 50. Thus, even when an operator operates the ON operating switch 33 to output an ON signal "1" of a manual suspension, the AND circuit 47 does not output an ON signal "1". That is, when an OFF signal "1" of an automatic suspension is output, processing of an OFF signal "1" of an automatic suspension is given priority over an ON signal "1" of a manual suspension from the security-system VDU 31 of the functional integration VDU 21 or the security-system VDU 22. When an OFF signal "1" of an automatic suspension is not output, an OFF signal "0" is inverted to an ON signal "1" in the NOT circuit 49, and is input to the AND circuit 50. Thus, when an operator operates the ON operating switch 33 to output an ON signal "1" of a manual suspension, the ON signal "1" is input to the AND circuit 50 via the OR circuit 11, and the AND circuit 50 may output an ON signal "1".

When an operator operates the ON operating switch 35 or the OFF operating switch 36 in the regular-use-system VDU 32 of the functional integration VDU 21, an ON signal "1" of a manual suspension or an OFF signal "1" of a manual suspension is output to the regular-use-system equipment 52.

In the embodiment, as described in the foregoing, the block device includes the AND circuit 41 to which a plant suspension signal (ON signal "1" of an automatic suspension) output from the security-system VDU 31 of the functional integration VDU 21, and a block signal (ON signal "1") output from the cutoff operating switch 39 of the security-system VDU 22 are input.

Herein, a function of the functional integration VDU 21 and the security-system VDU 22 in the device for monitoring an operation of a nuclear plant of the embodiment will be described.

Generally, an operator monitors an operation of a nuclear plant using the functional integration VDU 21. In a case where an abnormality is detected by an operational state of the plant, and a necessary operation is performed in the security-system VDU 31, when an abnormality is detected in equipment of the security-system equipment 51, the ON operating switch 33 of the security-system VDU 31 is operated to output an ON signal "1" of a manual suspension. Then, the ON signal "1" of a manual suspension output from the ON operating switch 33 is input to the AND circuit 41. In this instance, since the security-system VDU 31 of the functional integration VDU 21 is being normally operating, the cutoff operating switch 39 of the security-system VDU 22 is not operated, and an ON signal "0" is inverted in the NOT circuit 43 to be input to the AND circuit 41 as an ON signal "1". For this reason, the AND circuit 41 outputs an ON signal "1".

The OR circuit 44 outputs an ON signal "1" which is input from the AND circuit 41. In the AND circuit 50, since an OFF signal of an automatic suspension is not output, an OFF signal "0" is inverted to an OFF signal "1" in the NOT circuit 49 and is input to the AND circuit 50, the AND circuit 50 outputs an ON signal "1", and the ON signal "1" of a manual suspension is input to the security-system equipment 51 via the OR circuit 45 to safely suspend the security-system equipment 51.

When an operator detects an abnormality in the security-system VDU 31 of the functional integration VDU 21, the operator disables an operation by the security-system VDU 31, and performs an operation by the security-system VDU 22. That is, when an operator detects an abnormality in the security-system VDU 31, the operator operates the cutoff operating switch 39 of the security-system VDU 22. Then, an ON signal "1" is inverted in the NOT circuit 43 to be input to the AND circuit 41 as an ON signal "0". For this reason, even when an operator operates the ON operating switch 33 of the security-system VDU 31 to output an ON signal "1" of a manual suspension, and inputs the ON signal "1" of a manual suspension to the AND circuit 41, the AND circuit 41 does not output an ON signal "1" of a manual suspension since an ON signal "0" is input from the cutoff operating switch 39 of the security-system VDU 22.

Since the security-system VDU 31 of the functional integration VDU 21 is broken and may not be operated, an operator operates the ON operating switch 37 of the security-system VDU 22 to output an ON signal "1" of a manual suspension. Then, the ON signal "1" of a manual suspension output from the ON operating switch 37 is output to the OR circuit 44, and the ON signal "1" is output. In the AND circuit 50, as described in the foregoing, since an OFF signal "1" of an automatic suspension is input, an ON signal "1" is output, and the ON signal "1" of a manual suspension is input to the security-system equipment 31 via the OR circuit 45 to safely suspend the security-system equipment 31.

As described above, in the device for monitoring an operation of a nuclear plant of the embodiment, the functional integration VDU 21 is provided in which the regular-use-system VDU 32 that monitors an operation of the nuclear plant in a normal state and the security-system VDU 31 that suspends the nuclear plant in an abnormal state are included, and the security-system VDU 22 that suspends the nuclear plant in an abnormal state is provided. The functional integration VDU 21 is mounted to the first operating console 12, and the security-system VDU 22 is mounted to the second operating console 13.

As such, the functional integration VDU 21 including the security-system VDU 31 and the regular-use-system VDU 32 is mounted to the first operating console 12, and the security-system VDU 22 is mounted to the second operating console 13 and is used as a backup of the security-system VDU 31. For this reason, only the second operating console 13 may have a structure superior in a seismic resistance, and the first operating console 12 may have a structure having a general seismic resistance. Thus, an increase in size of the first operating console 12 due to seismic strengthening may be suppressed, and an operation may be facilitated.

In addition, in the device for monitoring an operation of a nuclear plant of the embodiment, the first operating console 12 is disposed in the center of the central control room 11, and the second operating console 13 is disposed near a wall surface of the central control room 11 to be adjacent to the first operating console 12. Accordingly, by appropriately disposing the respective operating consoles 12 and 13, it is possible to attempt an efficient use of a space within the central control room 11.

That is, by suppressing an increase in size of the first operating console 12, a disposition of various devices in the central control room 11 may be facilitated, a passage space may be easily ensured, workability may be enhanced, and other devices may be appropriately disposed.

In addition, in the device for monitoring an operation of a nuclear plant of the embodiment, the functional integration VDU 21 is provided in which the regular-use-system VDU 32 that monitors an operation of the nuclear plant in a normal state and the security-system VDU 31 that suspends the nuclear plant in an abnormal state are included, and the security-system VDU 22 that suspends the nuclear plant in an abnormal state is provided. The block device is provided to inhibit an operation of the security-system VDU 31 when the functional integration VDU 21 is in an abnormal state.

As such, when the functional integration VDU 21 is in a normal state, the security-system VDU 31 of the functional integration VDU 21 is used to safely suspend the nuclear plant in an abnormal state. On the other hand, when the functional integration VDU 21 is in an abnormal state, an operation of the security-system VDU 31 in the functional integration VDU 21 is inhibited by the block device, and the security-system VDU 22 is used to suspend the nuclear plant in an abnormal state. In this case, using the functional integration VDU 21, the nuclear plant in a normal state may be controlled, and the plant in an abnormal state may be suspended, and thus an operation in the nuclear plant may be facilitated. In addition, when the functional integration VDU 21 is in an abnormal state, an operation of the security-system VDU 31 by the functional integration VDU 21 is inhibited using the block device, and the nuclear plant in an abnormal state is suspended using the security-system VDU 22 functioning as a backup, and thus the plant in an abnormal state may be reliably suspended, and a high security of an operation control may be ensured.

In addition, in the device for monitoring an operation of a nuclear plant of the embodiment, the block device is provided in the security-system VDU 22. Accordingly, it is possible to suspend the nuclear plant in an abnormal state using the security-system VDU 22 immediately after an operation of the security-system VDU 31 in the functional integration VDU 21 is inhibited by the block device.

In addition, in the device for monitoring an operation of a nuclear plant of the embodiment, the block device includes the AND circuit 41 to which a plant suspension signal output from the security-system VDU 31 of the functional integration VDU 21 and a block signal output from the security-system VDU 22 are input. Accordingly, when the block device includes a logical circuit, it is possible to simplify the device.

In the embodiment described above, a disposition of the first operating console 12, the second operating console 13, the operation command console 14, and the large-size display panel 15 is not limited to the described disposition, and may be appropriately set by an area or a shape of the central control room 11, and a relation with another device.

INDUSTRIAL APPLICABILITY

The device for monitoring an operation of a nuclear plant according to the invention suppresses an increase in size of an operating console in the nuclear plant, and may facilitate an operation by providing the first operating console having the regular-use-system control function and the security-system control function, and the second operating console having the security-system control function, and may be applied to any nuclear plant.

REFERENCE SIGNS LIST

11 CENTRAL CONTROL ROOM
12 FIRST OPERATING CONSOLE
13 SECOND OPERATING CONSOLE
14 OPERATION COMMAND CONSOLE
15 LARGE-SIZE DISPLAY PANEL
21 FUNCTIONAL INTEGRATION VDU
22 SECURITY-SYSTEM VDU
31 SECURITY-SYSTEM VDU
32 REGULAR-USE-SYSTEM (NON-SECURITY-SYSTEM) VDU
39 CUTOFF OPERATING SWITCH (BLOCK DEVICE)
41 AND CIRCUIT (BLOCK DEVICE)
42 LATCH CIRCUIT (BLOCK DEVICE)
43 NOT CIRCUIT (BLOCK DEVICE)
44 OR CIRCUIT
45 OR CIRCUIT
46 NOT CIRCUIT
47 AND CIRCUIT
48 OR CIRCUIT
49 NOT CIRCUIT
50 AND CIRCUIT
51 SECURITY-SYSTEM EQUIPMENT
52 REGULAR-USE-SYSTEM EQUIPMENT

The invention claimed is:

1. A device for monitoring an operation of a nuclear plant, comprising:
   a first operating console having a regular-use-system control function of monitoring an operation of the nuclear plant in a normal state and a security-system control function of leading the nuclear plant in an abnormal state to a safe state; and
   a second operating console having a security-system control function of leading the nuclear plant in an abnormal state to a safe state, wherein
   the first operating console has a structure having a predetermined seismic resistance, and the second operating console has a structure having a seismic resistance superior to the seismic resistance of the first operating console.

2. The device according to claim 1, wherein the first operating console is disposed at a center of a central control room, and the second operating console is disposed near a wall surface of the central control room to be adjacent to the first operating console.

3. The device according to claim 1 further comprising a block device for inhibiting an operation of the security-system control function by the first operating console when the security-system control function in the first operating console is in an abnormal state.

* * * * *